(12) United States Patent
Ledbetter et al.

(10) Patent No.: US 11,711,258 B2
(45) Date of Patent: Jul. 25, 2023

(54) MONITORING AND SELF-HEALING OF DEPLOYED ENVIRONMENTS

(71) Applicant: Walmart Apollo, LLC, Bentonville, AR (US)

(72) Inventors: Joshua Ledbetter, Bentonville, AR (US); Jeremy Wayne Bowman, Ewa Beach, HI (US); Michael Samuhasilp, Centerton, AR (US); Nathan Anderson, Fayetteville, AR (US); Maria Cecilia Bustos, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 12 days.

(21) Appl. No.: 17/399,805

(22) Filed: Aug. 11, 2021

(65) Prior Publication Data

US 2021/0377106 A1 Dec. 2, 2021

Related U.S. Application Data

(63) Continuation of application No. 16/693,139, filed on Nov. 22, 2019, now Pat. No. 11,121,914.

(51) Int. Cl.
*H04L 41/0686* (2022.01)
*H04L 41/0631* (2022.01)
*H04L 41/0695* (2022.01)

(52) U.S. Cl.
CPC ...... *H04L 41/0686* (2013.01); *H04L 41/0631* (2013.01); *H04L 41/0695* (2013.01)

(58) Field of Classification Search
CPC ............. H04L 41/0686; H04L 41/0631; H04L 41/0695
USPC ......................................................... 709/224
See application file for complete search history.

(56) References Cited

U.S. PATENT DOCUMENTS

| | | |
|---|---|---|
| 7,616,638 B2 | 11/2009 | Samuels et al. |
| 7,630,305 B2 | 12/2009 | Samuels et al. |
| 7,656,799 B2 | 2/2010 | Samuels et al. |
| 7,698,453 B2 | 4/2010 | Samuels et al. |
| 8,233,392 B2 | 7/2012 | Samuels et al. |
| 8,238,241 B2 | 8/2012 | Samuels et al. |
| 8,259,729 B2 | 9/2012 | Samuels et al. |
| 8,310,928 B2 | 11/2012 | Samuels et al. |
| 8,411,560 B2 | 4/2013 | Samuels et al. |
| 8,462,630 B2 | 6/2013 | Samuels et al. |
| 8,553,699 B2 | 10/2013 | Samuels et al. |
| 8,824,490 B2 | 9/2014 | Samuels et al. |
| 9,008,100 B2 | 4/2015 | Samuels et al. |

(Continued)

*Primary Examiner* — Nicholas R Taylor
*Assistant Examiner* — Chong G Kim
(74) *Attorney, Agent, or Firm* — Morgan, Lewis & Bockius LLP; Manita Rawat

(57) ABSTRACT

In various examples, a system identifies a first issue object associated with the alert by making a first set of determinations, based on an alert of an active issue of a system resource. Additionally, the system can determine whether the active issue associated with the first issue object can be automatically corrected by one or more self-healing processes, based on the first issue object. Moreover, the system can implement the one or more self-healing processes, based on determining that the active issue associated with the first issue object can be automatically corrected by one or more self-healing processes.

15 Claims, 6 Drawing Sheets

(56) References Cited

U.S. PATENT DOCUMENTS

| | | | |
|---|---|---|---|
| 9,785,497 B1 | 10/2017 | Cook et al. | |
| 10,055,247 B2 | 8/2018 | Cabrera et al. | |
| 10,129,174 B2 | 11/2018 | Baughman et al. | |
| 10,409,697 B2 | 9/2019 | Chen et al. | |
| 10,498,837 B1 | 12/2019 | Bondalapati et al. | |
| 10,567,440 B2 | 2/2020 | Bansal et al. | |
| 2011/0125615 A1* | 5/2011 | Shirbabadi | G06Q 10/00 705/28 |
| 2013/0061085 A1 | 3/2013 | Rao | |
| 2013/0097304 A1 | 4/2013 | Asthana et al. | |
| 2014/0040454 A1 | 2/2014 | Ramsey et al. | |
| 2014/0075239 A1 | 3/2014 | Prathipati et al. | |
| 2014/0201145 A1 | 7/2014 | Dorman et al. | |
| 2014/0372788 A1 | 12/2014 | Vavrick et al. | |
| 2016/0224277 A1 | 8/2016 | Batra et al. | |
| 2017/0345015 A1 | 11/2017 | Ranganna et al. | |
| 2018/0150758 A1 | 5/2018 | Niininen et al. | |
| 2018/0357625 A1* | 12/2018 | Chin | G06F 11/0709 |
| 2019/0205202 A1 | 7/2019 | Erickson et al. | |
| 2020/0052993 A1 | 2/2020 | Liu | |
| 2020/0235985 A1* | 7/2020 | Embarmannar Vijayan | H04L 41/0672 |
| 2020/0235986 A1 | 7/2020 | Embarmannar Vijayan et al. | |

* cited by examiner

MONITORING AND SELF-HEALING OF DEPLOYED ENVIRONMENTS

CROSS-REFERENCE TO RELATED APPLICATIONS

This application is a continuation of U.S. patent application Ser. No. 16/693,139 filed Nov. 22, 2019; the aforementioned priority application being hereby fully incorporated by reference in their entirety.

TECHNICAL FIELD

This application relates generally to monitoring of deployed environments and, more particularly, to automatically monitoring and correcting deployed environments.

BACKGROUND

Monitoring of deployed environments includes evaluating, monitoring, and managing deployed services, applications, systems, databases, or other infrastructure (referred to herein as "components" or "resources") to ensure proper operation and health. In cloud-based environments with multiple instances of a resource, monitoring may be performed at various granularity, including monitoring individual instances, individual resources, clusters, and/or any other granularity.

Cloud monitoring allows a system administrator or other individual to correct issues in the deployed environment, such as unresponsive resources, incorrect deployments, and other problems. Current systems require users to interact with monitoring services to determine the current status of an environment. If a problem is detected, a system administrator or other individual must manually correct the error, for example, by redeploying one or more resources.

SUMMARY

In various embodiments, a system for monitoring a cloud environment is disclosed. The system includes a computing device configured to receive an alert associated with an active issue related to a component, generate an issue object based on the alert, and execute a self-healing flow based on an alert type of the alert.

In various embodiments, a non-transitory computer readable medium having instructions stored thereon is disclosed. The instructions, when executed by a processor cause a device to perform operations including receiving an alert associated with an active issue related to a component, generating an issue object based on the alert, and executing a self-healing flow based on an alert type of the alert.

In various embodiments, a computer-implemented method is disclosed. The method includes steps of receiving an alert associated with an active issue related to a component, generating an issue object based on the alert, and executing a self-healing flow based on an alert type of the alert.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
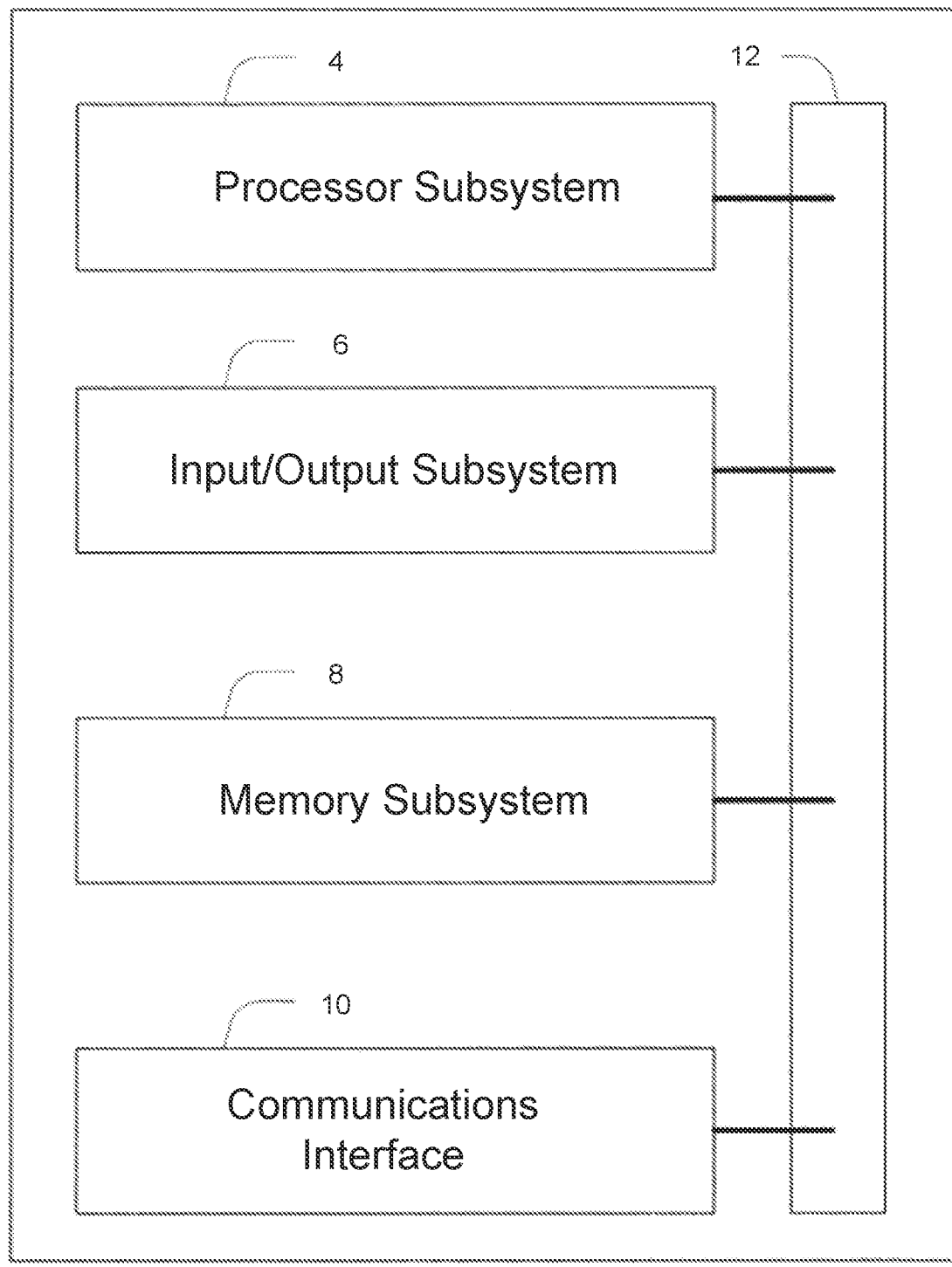
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
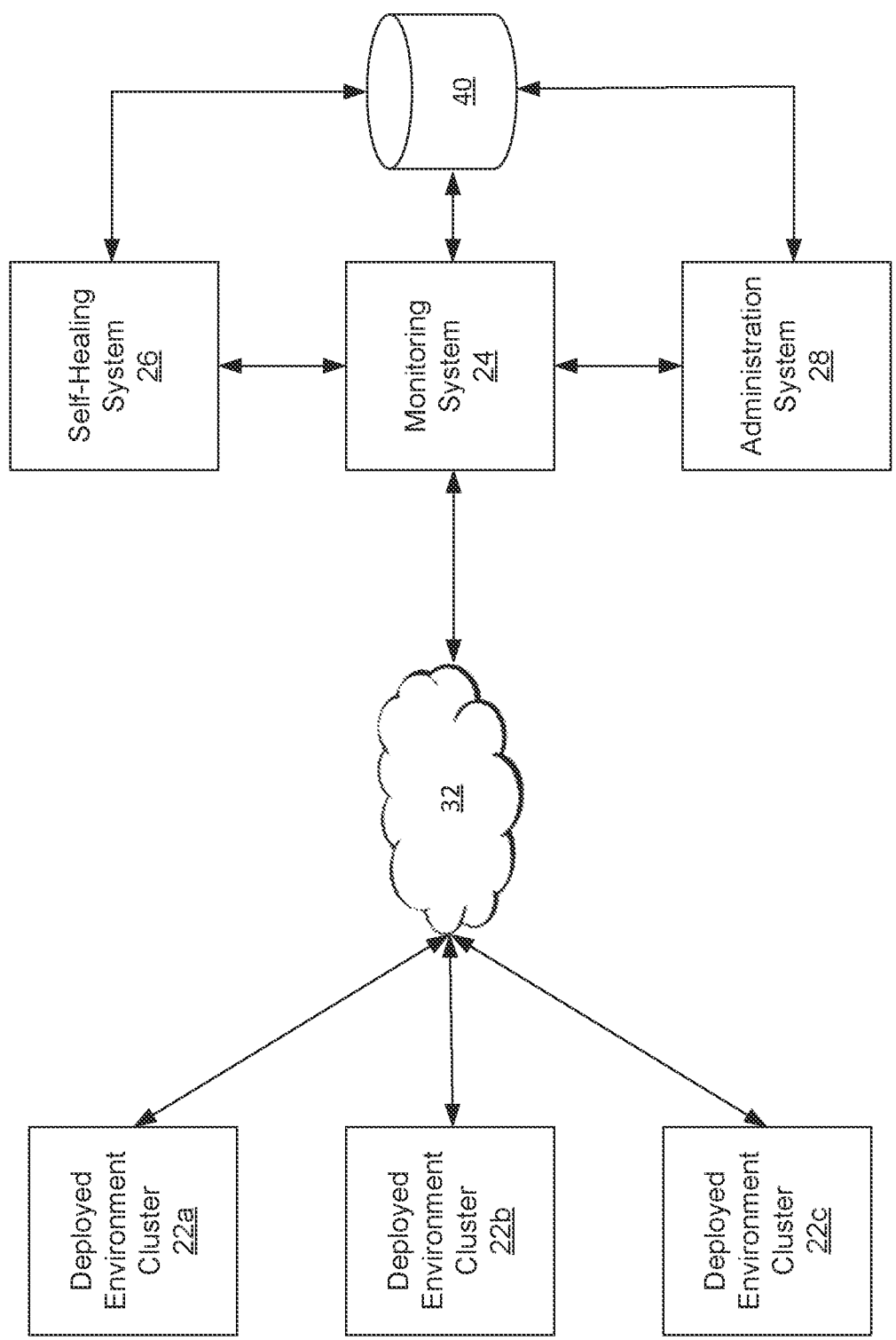
FIG. 2 illustrates a network configured to monitor and maintain a cloud environment, in accordance with some embodiments.

FIG. 2 illustrates a network environment 20 configured to monitor and maintain at least one deployed environment, in accordance with some embodiments. The network environment 20 includes a plurality of clusters 22a-22c including at least one system configured to receive and/or provide services, applications, systems, databases, and/or other infrastructure. For example, in some embodiments, each of the clusters 22a-22c includes a cloud computing environment configured to provide one or more services, applications, systems, databases, etc. In some embodiments, each of the clusters 22a-22c may provide the same environment and/or different resources or components.

Each of the clusters 22a-22c is in signal communication with a monitoring system 24. The monitoring system 24 is configured to monitor the health and availability of one or more resources in each of the clusters 22a-22c. The monitoring system 24 may be configured to monitor each cluster 22a-22c at any suitable level of granularity, such as, for example, general availability/up-time of each of the clusters 22a-22c, availability of specific resources within each of the clusters 22a-22c, and/or any other suitable granularity level. In some embodiments, and as discussed in greater detail below, the monitoring system 24 is configured to implement a monitoring process to identify, log correct, and/or generate notifications for active issues with respect to at least one of the clusters 22a-22c.

In some embodiments, the monitoring system 24 is in signal communication with a self-healing system 26. The self-healing system 26 is configured to implement one or more self-healing processes (or flows) to attempt to correct an active issue associated with an alert received by the monitoring system 24. In some embodiments, a received alert may be logged in a database cluster 40. One or more notifications may be generated and provided to other systems, such as, for example, the administrative system 28. Although embodiments are illustrated showing the monitoring system 24, the self-healing system 26, and the administration system 28 as independent systems, it will be appreciated that any of the illustrated systems may be combined and/or expanded into one or more systems.

Figure 3:
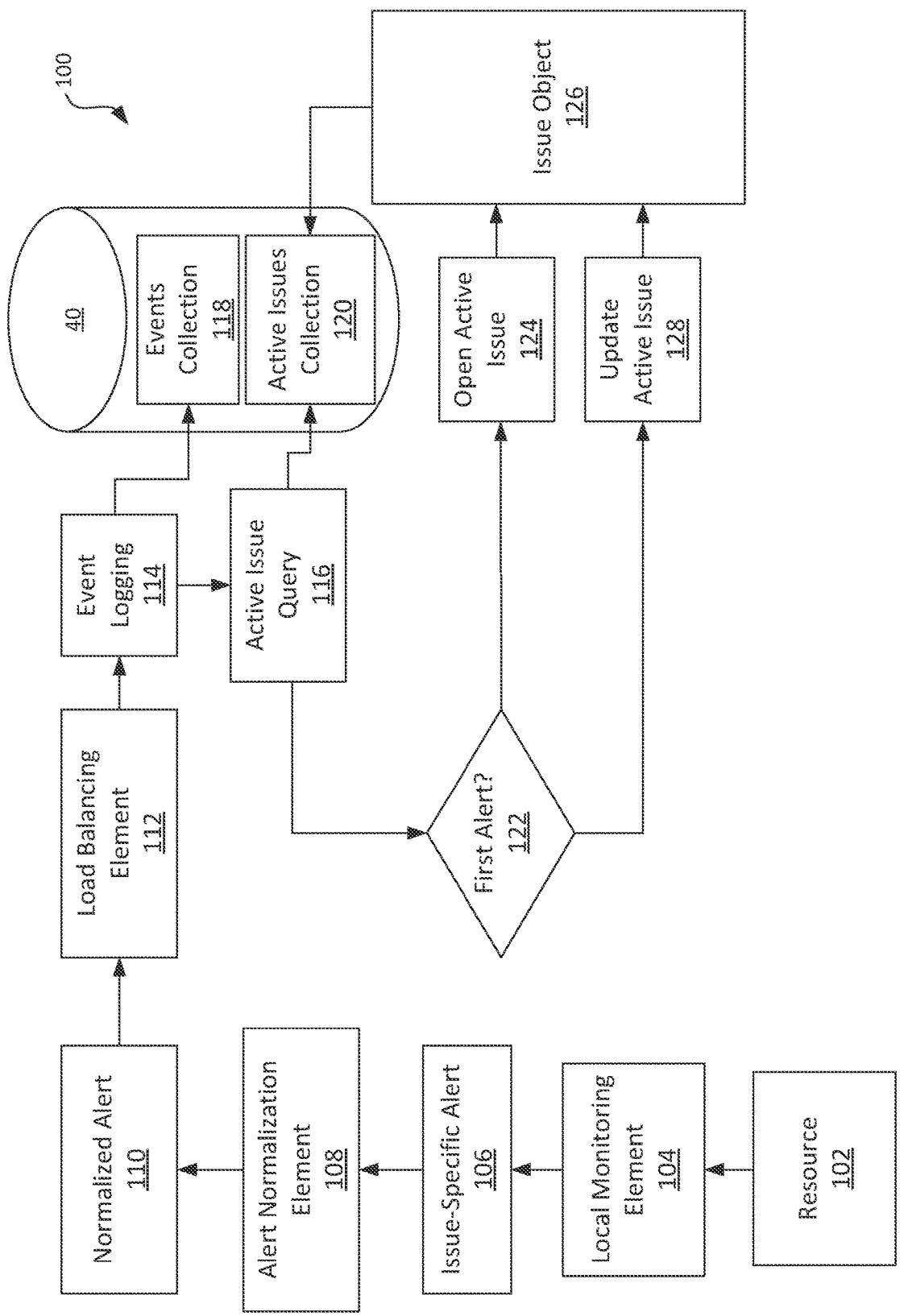
FIG. 3 illustrates a monitoring process, in accordance with some embodiments.

FIG. 3 illustrates a monitoring process 100 configured to be implemented by one or more systems, in accordance with some embodiments. Monitoring process 100 is configured to monitor the status of one or more resources 102 in a deployed environment, such as, for example, within a cluster 22a-22c. A local monitoring element 104 is executed by a system associated with the monitored environment, e.g., the cluster 22. The local monitoring client is configured to identify one or more issues experienced by the resource 102 and generate an issue-specific alert 106. For example, in various embodiments, the resource 102 may become unavailable, run out of memory, encounter an error, and/or otherwise encounter an issue that causes the resource 102 to become partially and/or completely unusable.

When the local monitoring client 104 identifies an active issue related to the resource 102, an issue-specific alert 106 is generated. The issue-specific alert 106 includes issue-specific information identifying the type of issue encountered by the resource 102. For example, in various embodiments, the issue-specific alert 106 may indicate that the at least one resource 102 is down (i.e., unresponsive), low on disk space, has connection issues, zookeeper issues, replication issues, CPU (central processing unit) issues, memory issues, and/or any other issues and/or errors. In some embodiments, the issue-specific alert 106 may be resent (e.g., re-generated) at a predetermined interval, such as, for example, a predetermined interval based on the type of alert 106, a predetermined interval based on the cluster 22a-22c at which the error occurred, and/or any other suitable interval. For example, in some embodiments, a resource down alert may be generated every 30 seconds, as such an error may be considered a high priority error. In contracts, a disk-space alert, a zookeeper alert, a CPU issue alert, and/or a memory issues alert may be considered a low priority alert and are generated on a longer interval, such as every 5 minutes. Other alerts, such as an active connection alert or a replication issue alert may be considered medium-priority and may be generated at an interval between the low-priority and high-priority intervals, such as, for example, every 60 seconds.

In some embodiments, an alert normalization element 108 receives the issue-specific alert 106 and generates a normalized (or standardized) alert 110. The normalized alert 110 may include a container, such as, for example, a JSON container, configured to present the information contained within the issue-specific alert 106 in a standard format. In some embodiments, the issue-specific alert 106 is wrapped in and/or otherwise included in the normalized alert 110.

The normalized alert 100 is provided to load balancing element 112 configured to implement a load balancing process, such as the load balancing process 400 discussed below in conjunction with FIG. 6. In some embodiments, the load balancing element 112 assigns the received normalized alert 110 to one of a plurality of monitoring servers configured to implement an self-healing and notification process, such as, for example, the self-healing and notification process 200 discussed in greater detail below with respect to FIG. 4. The received normalized alert 110 may be provided to an event logging element 114 configured to log the normalized alert 110 and/or the active issue associated with the normalized alert 110 in an event collection 118 maintained by a database cluster, such as, for example, the database cluster 40.

After logging the normalized alert 110 in the event collection 118, an active issue query 116 is performed to determine whether the normalized alert 110 is associated with a previously identified active issue. For example, in some embodiments, an active issue collection 120 containing issue objects associated with active issues is queried to determine whether an issue object exists for the issue associated with the normalized alert 110. If the active issue was previously identified, the issue object associated with the active issue may be retrieved from the active issue collection 120.

In some embodiments, a check 122 is performed to determine whether the normalized alert 110 is the first alert that has been received for the associated active issue. In some embodiments, the check 122 is combined with the active issue query 120 such that if the active issue query does not return an issue object, the normalized alert 110 is considered to be a first alert for the active issues. As an example, if a database becomes unresponsive (e.g., is down), an issue-specific alert 106 will be generated indicating that the database is down. After receiving the normalized alert 110 generated from the issue-specific alert, a system, such as the monitoring system 24, may query 116 an active issues collection 120 to request an issue object for the active issues. If the query 120 returns an issue object, at least one prior alert associated with the active issue has been received and the current alert is not considered a first alert. Alternatively, if an issue object is not returned, then no prior alerts have been received and the current alert is the first alert.

If the check 122 determines that the received normalized alert 110 is a first alert, an active issue generation element 124 generates a new issue object 126 associated with the active issue. The issue object 126 may include any suitable data structure, such as, for example, a database document, container object, etc. In some embodiments, the issue object 126 includes one or more fields configured to identify data associated with the active issue. For example, in various embodiments, the issue object 126 may include, but is not limited to, one or more fields identifying a server name, an alert type, alert information, an initial alert time, a last updated time, a resolved time, an environment type, a critical alert indicator, a platform, etc. associated with the active issue. The issue object 126 is stored in the active issues collection 120.

If the check 122 determines that the received normalized alert 110 is a subsequent alert (e.g., is not the first alert), an active issue updated element 128 updates an existing active issue object 126. In some embodiments, the existing issue object 126 is updated to include the latest alert time and information. In some embodiments, one or more additional processes, such as a process of automatically correcting a detected issue in a cloud environment discussed below, is initiated when an active issue object 126 is created and/or updated.

Figure 4:
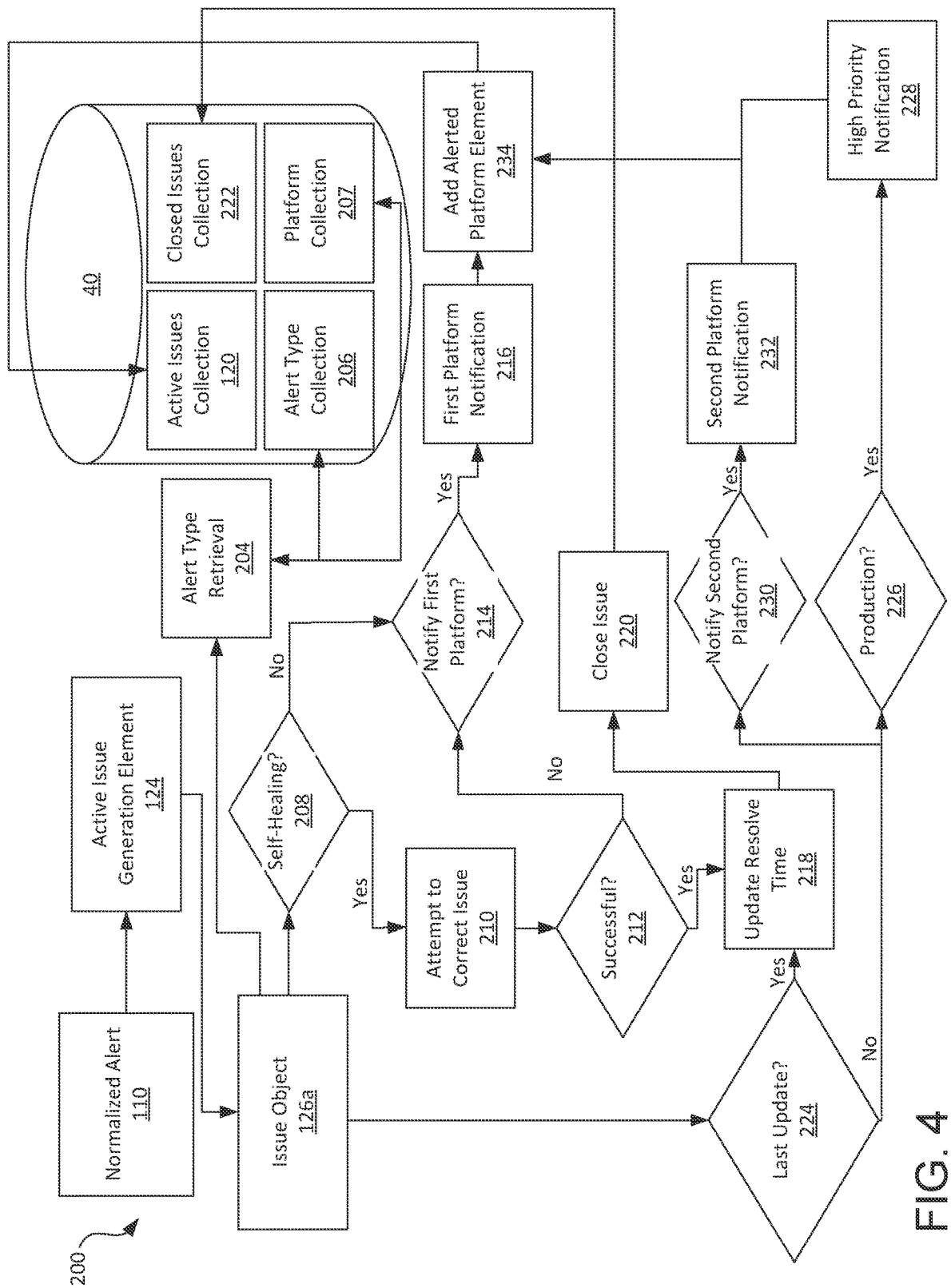
FIG. 4 illustrates a self-healing and user-alerting process for an active issue, in accordance with some embodiments.

FIG. 4 illustrates a self-healing and user-alerting process 200 for an active issue, in accordance with some embodiments. As discussed above, in some embodiments, an active issue generating element 124 is configured to map the normalized alert 110 onto an issue object 126a. In some embodiments, an alert type and platform are retrieved 204 from an alert type collection 206 and a platform information collection 207 maintained by a database cluster, such as the database cluster 40. In some embodiments, elements of the issue object 126a are determined by the retrieved alert type, a platform corresponding to the retrieved alert type, and/or any other suitable factor. For example, in one embodiment, a specific type of alert and/or platform result in an issue object 126a including an alert type, an environment type, an initial time (e.g., initial time of the alert/issue), a last updated element (e.g., time of last update regarding the issue), a platform element (e.g., platform executing the component having the issue), resolve time element (e.g., element indicating the time the issue was resolved), one or more alert platform elements (e.g., indicating which platforms should receive an alert based on the issue), an alert interval element (i.e., indicating how often to generate the alerts), a platform event element (i.e., indicating which platforms should receive an event based on the alert), a self-healing element (i.e., indicating whether the particular alert type/active issue is amenable to self-healing execution), and/or any other suitable elements.

In some embodiments, the self-healing and alerting process 200 performs a self-healing check 208 to determine whether the active issue associated with the issue object 126*a* can be automatically corrected by one or more self-healing processes, for example, the self-healing process 300 discussed in greater detail below. In some embodiments, a self-healing element in the issue object 126*a* is set to "yes" or "true" to indicate self-healing is possible and "no" or "false" to indicate self-healing is not possible. If the self-healing check 206 determines that self-healing is possible, the self-healing and alerting process 200 attempts to automatically correct 210 the active issue using one or more self-healing processes. A subsequent check 212 may be performed to determine whether the attempt to correct 208 the active issue was successful.

If the active issue is successfully corrected, the self-healing and user-notification process 200 updates the resolved time 218 of the issue object 126*a* and closes 220 the active issue. For example, in some embodiments, a resolved time element is updated to the current time and an active issue element is transitioned to "false" after the self-healing process has completed. In some embodiments, the issue object 126*a* is migrated from the active issues collection 120 to a closed issues collection 222 maintained by the database cluster 40.

If the active issue associated with the issue object 126*a* cannot be self-healed, or if the attempt to automatically correct 210 the active issue fails, one or more platform-specific notifications may be generated. For example, in some embodiments, a check 214 is performed to determine whether a first platform should be notified given the specific alert type, platform, and/or other parameters of the issue object 126*a*. In some embodiments, the check 214 may be configured to determine the value of a first platform alert element included in the issue object 126*a*. If the first platform notification element is set to "yes" or "true," the first platform is notified 216, for example, by generation of a platform-specific notification for the first platform. The platform-specific notification may include information regarding the issue object, the resource associated with the active issue, the attempt to self-heal, and/or any other suitable information. In some embodiments, the first platform includes a chat platform, such as, for example, slack.

In some embodiments, only a single alert is generated for each platform. For example, in some embodiments, a prior alert check is performed to determine if an alert has already been generated for the first platform. If an alert has not been generated, the platform-specific alert is generated and the issue object 126*a* may be updated, as discussed in greater detail below, to include a first platform alert element indicating that the first platform has been alerted. In some embodiments, the updated issue object 126*a* is stored in the active issue collection 120 of the database cluster 40.

Alternatively and/or simultaneously, a last updated check 224 may be performed to determine if the last update received for the active issue is older than an update interval associated with the alert type. For example, in some embodiments, a last updated element in the issue object 126*a* is set to a time value corresponding to the last alert or update received regarding the active issue associated with the component 102. An alert interval element of the issue object 126*a* may be set to a value corresponding to the frequency of an issue-specific alert 106 generated for the active issue associated with the issue object 126*a*. The value of the last updated element may be compared to the value in the alert interval element. If the value of the last updated element is greater than the value of the alert interval element, the active issue is considered resolved (as no additional alerts have been generated in the alert interval). However, if the value of the last updated element is less than the alert interval element, the self-healing and user-alerting process 200 considers the issue associated with the issue object 126*a* to be active.

In some embodiments, if the last updated check 224 determines the issue remains active, one or more additional user notifications may be generated. For example, in some embodiments, a production check 226 is performed to determine if the component associated with the active issue is associated with a production environment. If the component is associated with a production environment, i.e., the production check 226 returns a true/yes result, a high-priority, platform-specific notification 228 may be generated. The high-priority, platform-specific notification may include a pager duty notification (e.g., a notification generated and sent to a pager associated with an "on-call" individual for urgent issues).

In some embodiments, an additional check is performed (not shown) to determine if the active issue is a high-priority issue (e.g., is associated with a high-priority or critical resource 102). For example, in some embodiments, a high-priority element of the issue object 126*a* may be set to "true" when the issue object is related to a high-priority resource 102 and/or cluster 22*a*-22*c*. In some embodiments, an additional check may be performed to determine whether a high-priority notification has already been generated for the active issue. If a high-priority notification has not been previously generated, the high-priority notification 228 may be generated and transmitted to a notification platform, such as a pager platform. In some embodiments, if any of the checks fail, a high-priority notification is not generated.

In some embodiments, additional notifications may be generated for specific alert types, active issues, components, etc. For example, a second platform-specific notification 232 may be generated and provided to a second platform, such as, for example, a JIRA platform for one or more alert types. A second platform-specific notification check 230 determines whether a second-platform specific notification 232 should been generated and provided to the second platform. For example, in some embodiments, if a second-platform notification element, such as a JIRA notification element, is set to "true" or "yes," the issue object 126*a* is associated with an active issue that requires a notification to be sent to a second platform. The second-platform notification 232 is provided to the second platform. In some embodiments, the second-platform notification 232 is generated according to a process identified by a second-platform event element included in the issue object 126*a*. In some embodiments, an additional check (not shown) may be performed to determine if a prior notification has been generated and provided to the second platform. If a prior second-platform-specific notification has been generated, the self-healing and notification process 200 may forego generation of the second-platform-specific alert.

In some embodiments, if a platform-specific notification is generated, the issue object 126*a* is updated 234 to indicate that a platform-specific alert has been generated. The updated issue object 126*a* is stored in the active issues collection 120. If one or more additional alerts are received for the same active issue, additional notifications are not generated for the platforms that have been previously notified.

Figure 5:
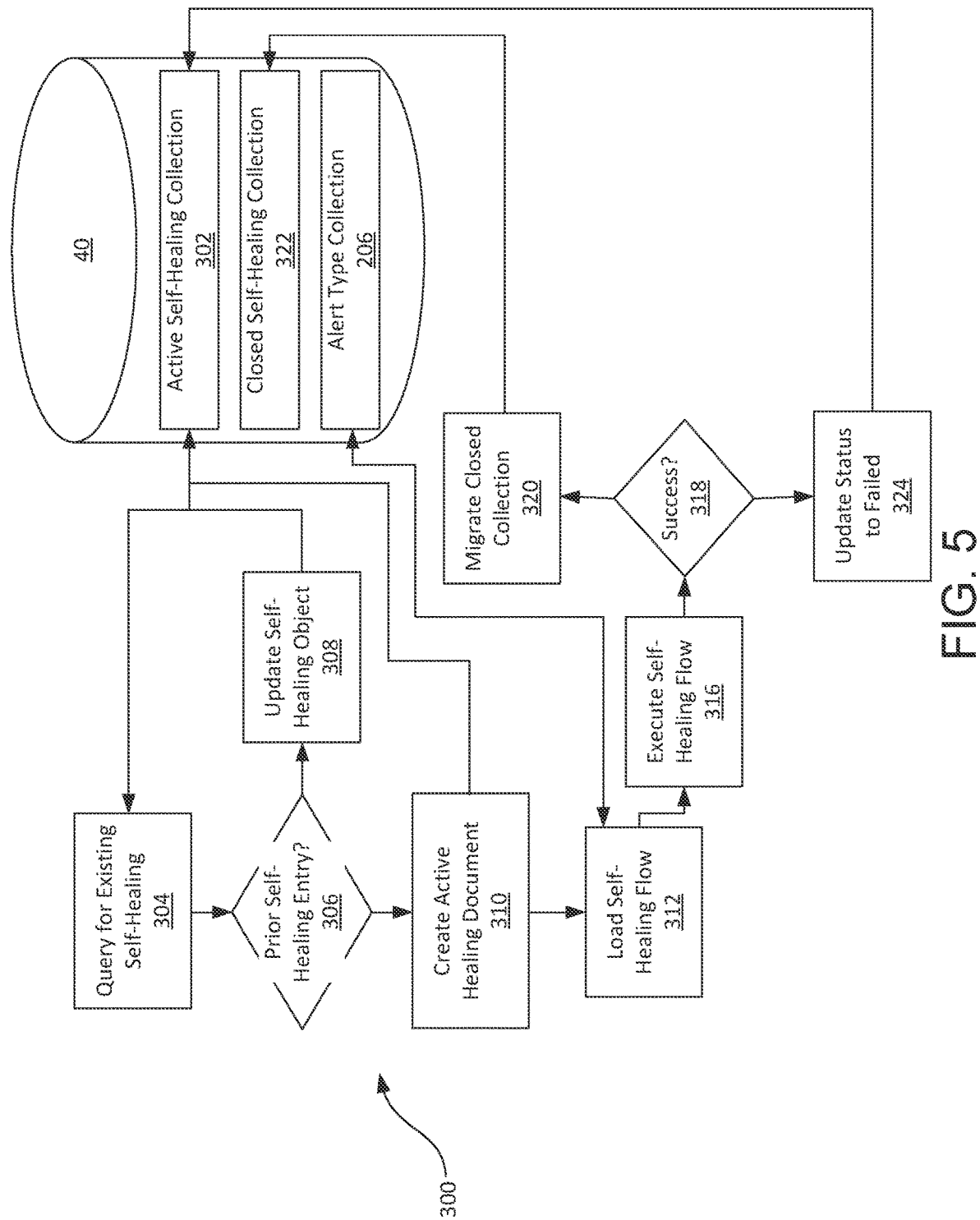
FIG. 5 illustrates an automatic correction process for an active issue, in accordance with some embodiments.

FIG. 5 illustrates automated healing process 300 for correction an active issue, in accordance with some embodiments. In some embodiments, the automated healing process 300 may be implemented by one or more systems, such as, for example, a monitoring system 24, a self-healing system 26, and/or any other suitable system. The self-healing process 300 may be implemented independently and/or as part of an additional process, such as, for example, as part of a self-healing and notification process 200.

In some embodiments, a self-healing process is initiated as part of a self-healing and notification process 200 such as, for example, as an attempt to correct 208 an active issue, as discussed above in conjunction with FIG. 4. An active self-healing collection 302 maintained by the database cluster 40 is queried 304 to obtain a self-healing object (e.g., a self-healing document or database entry) associated with the identified active issue. A check 306 may be performed on the result of the query 304. If a self-healing object has already been created, the check 306 is successful and the self-healing object 304 is loaded from the self-healing collection 302. The self-healing object may be updated 308 to include updated information received from the latest alert that initiated the self-healing process 300. In some embodiments, a last updated field of the self-healing object is updated to include the current time, reflecting the most recent update.

If a self-healing object is not retrieved from the active self-healing collection 302, the automated healing process 300 creates 310 an active self-healing object in the active self-healing collection 302 maintained in the database cluster 40. A self-healing flow may be loaded 312 based on one or more aspects of a received normalized alert 110 and/or issue object 126a, such as, for example, an alert type of the issue-specific alert 106. For example, in some embodiments, a database down alert may have a first self-healing flow configured to re-enable the database and a disk space alert may have a second self-healing flow configured to add additional disks to a cluster associated with the alert. It will be appreciated that any number of self-healing flows may be stored and/or retrieved. Each alert type may have a single self-healing flow, a shared self-healing flow (e.g., shared by multiple alert types), and/or multiple self-healing flows associated therewith. In some embodiments, the self-healing flows are stored in and/or retrieved from a self-healing flow collection 314 maintained by the database cluster 40, although it will be appreciated that the self-healing flows may be stored in and/or retrieved from any suitable storage location.

After retrieving 312 the self-healing flow, the automated healing process 300 executes 316 the self-healing flow and attempts to correct the underlying active issue. After executing the self-healing flow, a check 318 may be performed to determine whether the self-healing flow was successful. For example, the check 318 may include polling or querying the component 102 associated with the active issue, waiting a predetermined time period greater than the alerting period to determine if additional alerts are generated, and/or any other suitable confirmation process.

If the self-healing flow successfully corrected the active issue, the self-healing object is migrated 320 (e.g., moved) from the active self-healing collection 302 to a closed self-healing collection 322 maintained by the database cluster 40. If the self-healing flow was unsuccessful, the self-healing object may be updated 324 to indicate the self-healing status is "failed." In some embodiments, after updating 324 the self-healing status, additional alerting processes as discussed above with respect to FIG. 4 are triggered. In some embodiments, the updated self-healing object is stored in the active self-healing collection 302 such that the self-healing object may be loaded from the active self-healing object 302 by during future attempts to correct the active issue.

Figure 6:
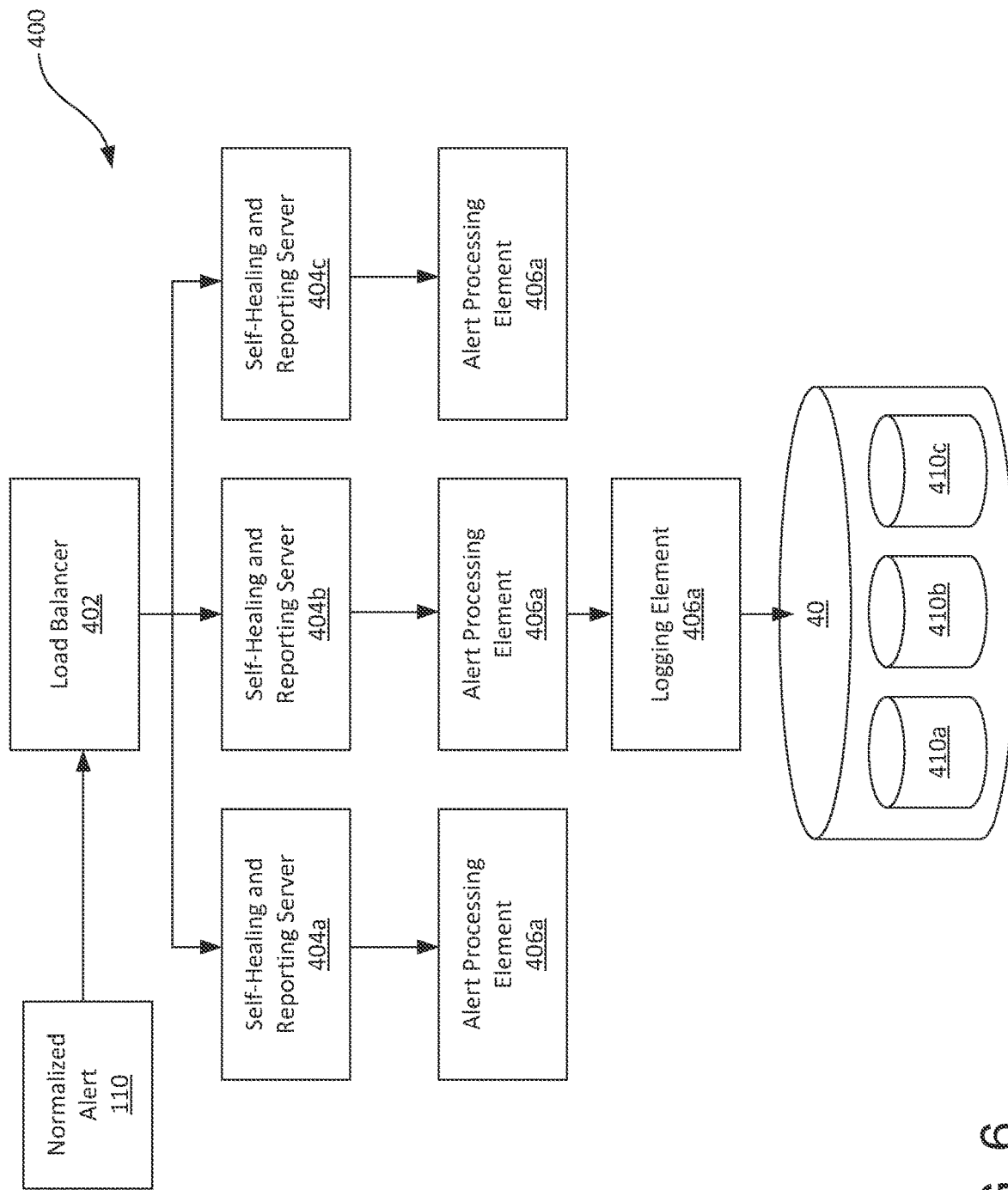
FIG. 6 illustrates a load balancing process for a received alert, in accordance with some embodiments.

FIG. 6 illustrates a backend logging process 400 for logging alerts generated by a cloud monitoring process, in accordance with some embodiments. The backend logging process 400 may be executed as part of a monitoring process, such as the cloud process 200 discussed above, and/or may be executed as a stand-alone process. The backend logging process 400 may be implemented by any suitable system, such as, for example, a monitoring system 24, a self-healing system 26, and/or any other suitable system.

In some embodiments, a normalized alert 110 is received and provided to a load balancer 402 configured to implement load balancing for a monitoring process, such as the monitoring process 200 discussed above. The load balancer 402 selects one of a plurality of servers 404a-404c to receive and process the normalized alert 110. In some embodiments, the server 404a-404c is selected based on one or more load balancing processes. After the normalized alert 110 is provided to the selected one of the plurality of servers 404a-404c, an alert processing element 406a-406c is configured to process the normalized alert 110. The alert processing element 406a-406c may be configured to process specific alerts having a predetermined format, such as a JSON package, generated by the alerting process 100, as discussed in greater detail above. In some embodiments, processing may include, but is not limited to, generating an issue object based on the normalized alert 110.

After processing the alert, a logging element 408 is configured to log the normalized alert 110 (and/or the active issue associated with the normalized alert 110) in a database cluster 40. The database cluster 40 may include the same database cluster 40 illustrated in FIG. 3 and/or may be a different database cluster. Each normalized alert 110 may be stored in one of a plurality of nodes 410a-410c maintained within the database cluster 40.

Although the subject matter has been described in terms of exemplary embodiments, it is not limited thereto. Rather, the appended claims should be construed broadly, to include other variants and embodiments, which may be made by those skilled in the art.

What is claimed is:

1. A system comprising:
one or more processors; and
a memory resource storing a set of instructions that when executed by the one or more processors, cause the one or more processors to:
based on an alert of an active issue of a system resource, identify a first issue object associated with the alert by making a first set of determinations;
based on the first issue object, determine whether the alert is a first alert or a subsequent alert;
when the alert is the first alert, based on the first issue object, determine whether the active issue associated with the first issue object can be automatically corrected by a first self-healing process;
when the alert is a subsequent alert, based on the first issue object and the subsequent alert, determine whether the active issue associated with the first issue object can be automatically corrected by a second self-healing process;
based on determining that the active issue associated with the first issue object can be automatically corrected by the first self-healing processes, implement the first self-healing process; and based on determining the active issue associated with the first issue object can be automatically corrected by the second self-healing processes, implement the second self-healing process;
wherein the first issue object includes a resolved time element, and execution of the set of instructions, by the one or more processors, further causes the one or more processors to:
determine the first self-healing process or the second self-healing process was successful or failed;
responsive to determining that the first self-healing process or the second self-healing process was successful, update the resolved time element of the first issue object; and
responsive to determining the first self-healing process or the second self-healing process failed, implement one or more platform alert processes.

2. The system of claim 1, wherein the first issue object includes a self-healing element, the self-healing element indicates whether the active issue associated with the first issue object can be automatically corrected by one or more self-healing processes.

3. The system of claim 2, wherein the self-healing element indicates that the active issue of the first issue object can be automatically corrected.

4. The system of claim 1, wherein the first issue object includes a platform alert element, and wherein the one or more platform alert processes includes:
based at least on the platform alert element of the first issue object, determining whether a particular platform should be notified.

5. The system of claim 4, wherein the one or more platform alert processes further includes:
based on determining that the particular platform should be notified, generating a platform-specific notification for the particular platform.

6. The system of claim 5, wherein the platform-specific notification includes information regarding the first issue object, the system resource associated with the first issue object, and the attempt to self-heal.

7. A computer-implemented method comprising:
based on an alert of an active issue of a system resource, identifying a first issue object associated with the alert by making a first set of determinations;
based on the first issue object, determine whether the alert is a first alert or a subsequent alert;
when the alert is the first alert, based on the first issue object, determining whether the active issue associated with the first issue object can be automatically corrected by a first self-healing process;
when the alert is a subsequent alert, based on the first issue object and the subsequent alert, determining whether the active issue associated with the first issue object can be automatically corrected by a second self-healing process;
based on determining that the active issue associated with the first issue object can be automatically corrected by the first self-healing process, implementing the first self-healing process; and
based on determining the active issue associated with the first issue object can be automatically corrected by the second self-healing processes, implementing the second self-healing process;
wherein the first issue object includes a resolved time element, and once the one or more self-healing processes has been implemented;
determining the first self-healing process or the second self-healing process was successful or failed;
responsive to determining that the first self-healing process or the second self-healing process was successful, updating the resolved time element of the first issue object; and
responsive to determining the first self-healing process or the second self-healing process failed, implementing one or more platform alert processes.

8. The computer-implemented method of claim 7, wherein the first issue object includes a self-healing element, the self-healing element indicates whether the active issue associated with the first issue object can be automatically corrected by one or more self-healing processes.

9. The computer-implemented method of claim 8, wherein the self-healing element indicates that the active issue of the first issue object can be automatically corrected.

10. The computer-implemented method of claim 7, wherein the first issue object includes a platform alert element, and wherein the one or more platform alert processes includes:
based at least on the platform alert element of the first issue object, determining whether a particular platform should be notified.

11. The computer-implemented method of claim 10, wherein the one or more platform alert processes further includes:
based on determining that the particular platform should be notified, generating a platform-specific notification for the particular platform.

12. The computer-implemented method of claim 11, wherein the platform-specific notification includes information regarding the first issue object, the system resource associated with the first issue object, and the attempt to self-heal.

13. A non-transitory computer-readable medium storing instructions, that when executed by one or more processors of a system, cause the system to:
based on an alert of an active issue of a system resource, identify a first issue object associated with the alert by making a first set of determinations;
based on the first issue object, determine whether the alert is a first alert or a subsequent alert;
when the alert is the first alert, based on the first issue object, determine whether the active issue associated with the first issue object can be automatically corrected by a first self-healing process;
when the alert is a subsequent alert, based on the first issue object and the subsequent alert, determine whether the active issue associated with the first issue object can be automatically corrected by a second self-healing process;
based on determining that the active issue associated with the first issue object can be automatically corrected by the first self-healing process, implementing the first self-healing process; and
based on determining the active issue associated with the first issue object can be automatically corrected by the second self-healing processes, implement the second self-healing process;
wherein the first issue object includes a resolved time element, and execution of the instructions, by the one or more processors, further causes the system to:
determining the first self-healing process or the second self-healing process was successful or failed;

responsive to determining that the first self-healing process or the second self-healing process was successful, update the resolved time element of the first issue object; and responsive to determining the first self-healing process or the second self-healing process failed, implementing one or more platform alert processes.

14. The non-transitory computer-readable medium of claim 13, wherein the first issue object includes a self-healing element, the self-healing element indicates whether the active issue associated with the first issue object can be automatically corrected by one or more self-healing processes.

15. The non-transitory computer-readable medium of claim 14, wherein the self-healing element indicates that the active issue of the first issue object can be automatically corrected.

* * * * *